(12) United States Patent
Schmidt

(10) Patent No.: US 11,790,507 B2
(45) Date of Patent: Oct. 17, 2023

(54) VARIABLE SPEED PROFILE EXTRUSION PORTION CUTTING HEAD AND CONTROL SYSTEM

(71) Applicant: Norman G. Schmidt, Burnaby (CA)

(72) Inventor: Norman G. Schmidt, Burnaby (CA)

(73) Assignee: Food Machinery Engineering LTD.

( * ) Notice: Subject to any disclaimer, the term of this patent is extended or adjusted under 35 U.S.C. 154(b) by 353 days.

(21) Appl. No.: 17/009,548

(22) Filed: Sep. 1, 2020

(65) Prior Publication Data
US 2021/0137154 A1 May 13, 2021

Related U.S. Application Data

(60) Provisional application No. 62/894,917, filed on Sep. 2, 2019.

(51) Int. Cl.
| | |
|---|---|
| *A23P 30/20* | (2016.01) |
| *G06T 7/00* | (2017.01) |
| *A47J 36/02* | (2006.01) |
| *C09D 5/22* | (2006.01) |
| *B05B 13/02* | (2006.01) |
| *H04N 7/18* | (2006.01) |
| *B08B 9/46* | (2006.01) |

(Continued)

(52) U.S. Cl.
CPC ............. *G06T 7/0004* (2013.01); *A21C 3/04* (2013.01); *A21C 3/10* (2013.01); *A23P 30/20* (2016.08); *A47J 36/025* (2013.01); *B05B 13/0221* (2013.01); *B08B 9/46* (2013.01); *B26D 3/24* (2013.01); *C09D 5/22* (2013.01); *H04N 7/18* (2013.01)

(58) Field of Classification Search
CPC .......... G06T 7/0004; A23P 30/20; A21C 3/04; B26D 3/24
USPC ..................................... 99/486, 509
See application file for complete search history.

(56) References Cited

U.S. PATENT DOCUMENTS

| | | | |
|---|---|---|---|
| 11,324,228 B1* | 5/2022 | Benson | A22C 17/008 |
| 2007/0172533 A1* | 7/2007 | Pinchot | B29B 9/06 425/142 |

(Continued)

*Primary Examiner* — Omar Flores Sanchez
(74) *Attorney, Agent, or Firm* — Tangent Law Group, PLLC; Eric J. Weierstall, esq.

(57) ABSTRACT

The invention is directed to a foodstuff extrusion portioning device and more specifically a cutter head assembly on such an extruder having a servo motor, a cutter shuttle coupled to a cutting element, a controller and being programmed via a product variable to provide a velocity profile. The cutter in the velocity profile has a first velocity and it reduces speed to a second velocity and goes more slowly through the last portion of the foodstuff. The at least two velocities being fully programmable and the controller can provide for instantaneous and additional programmed velocities throughout the cutting profile. The cutter further providing tilt control so it can drop the portion at the moment the portion detaches from the extruded foodstuff stream. It cuts and/or breaks off portions in a far more uniform and controllable manner to more accurately portion and better place the cut portions. This also provides the portion with minimal residual energy pushing it forward as it drops through the effect of gravity and the cutter can be used so as to further direct and push the portion downward so as to optimally place it.

15 Claims, 11 Drawing Sheets

(51) Int. Cl.
*A21C 3/04* (2006.01)
*A21C 3/10* (2006.01)
*B26D 3/24* (2006.01)

(56) References Cited

U.S. PATENT DOCUMENTS

| | | | |
|---|---|---|---|
| 2010/0143549 A1* | 6/2010 | Hoyt | A21C 11/16 |
| | | | 99/324 |
| 2014/0087047 A1* | 3/2014 | Edelman | B29C 48/2556 |
| | | | 425/308 |
| 2015/0208717 A1* | 7/2015 | Higuchi | A23P 30/20 |
| | | | 425/207 |
| 2018/0064158 A1* | 3/2018 | Baechtle | A21C 5/00 |
| 2018/0075406 A1* | 3/2018 | Kingston | H04L 9/0643 |
| 2022/0104530 A1* | 4/2022 | Graham | A23P 20/20 |

\* cited by examiner

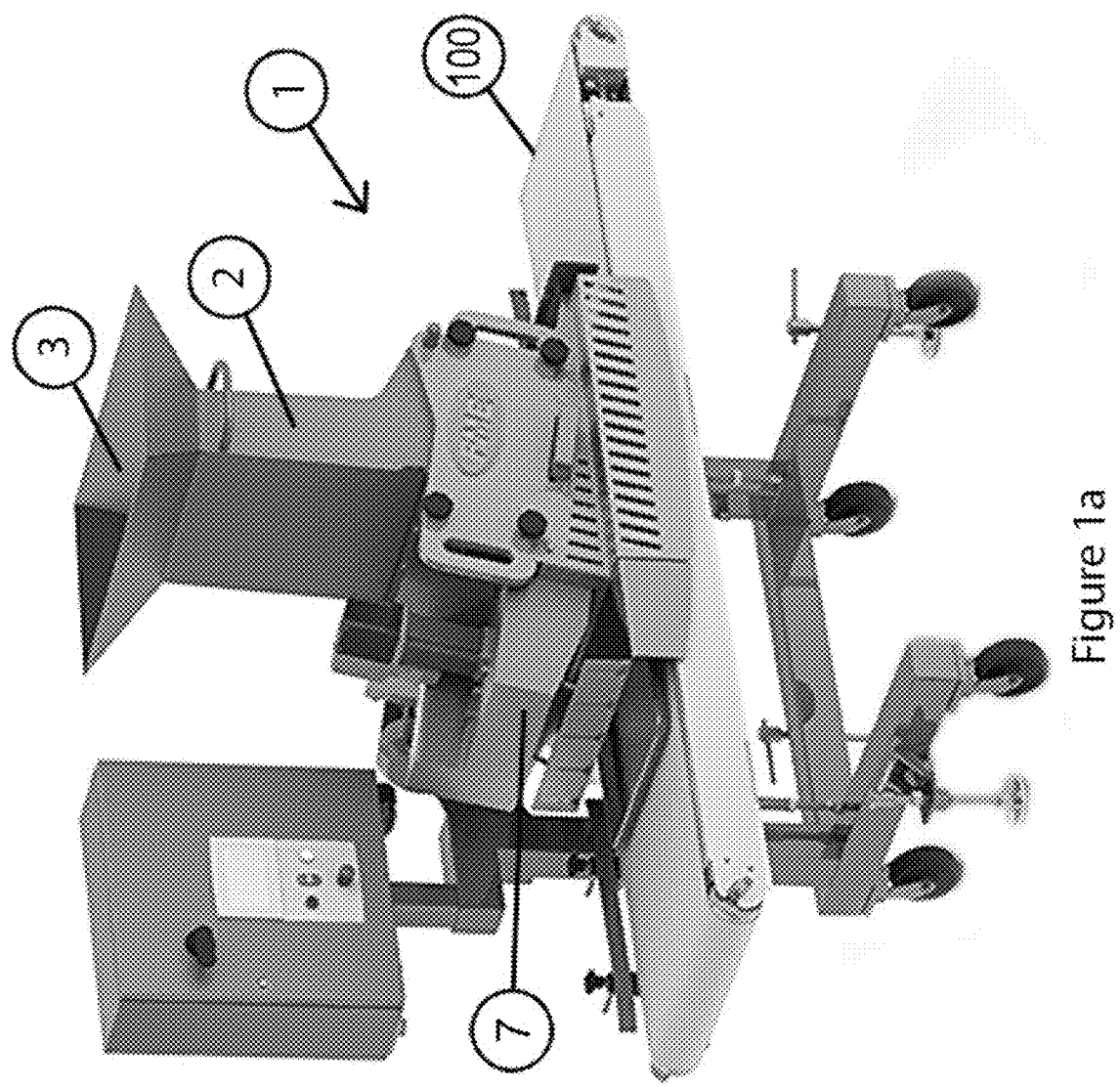

VARIABLE SPEED PROFILE EXTRUSION PORTION CUTTING HEAD AND CONTROL SYSTEM

CROSS-REFERENCE TO RELATED APPLICATIONS

This application claims the priority of U.S. provisional patent application 62/894,917, filed Sep. 2, 2019, which is incorporated herein by reference.

FIELD OF THE INVENTION

The invention is directed to an extrusion portioning machine and cutter head assembly and control system to cut and place portioned materials so as to produce more uniform portions such that when portions are cut that they are much easier to place or to cut and place as products in a more accurate and repeatable manner.

BACKGROUND OF THE INVENTION

It is often the case that in processing semi-solid materials in manufacturing operations and in particular when processing foodstuffs, specifically semi-viscous foodstuff products, to achieve a finished product accurate and repeatable portioning is necessary. Specifically, cutting portions such as when semi-viscous foodstuff products are flowing out of a portion extruder nozzle, such as with cookie dough, there are forces and energies present that effect how the cut portion separates from the stream and how repeatable and accurately the cutter places the finished portion after the portion is cut or severed from the product extrusion stream.

A non-limiting example of such an operation is during the preparation of cookies from cookie dough. There are a wide variety of variables affecting the cutting, portioning and placing that occurs at the cutter head at the end of the extrusion process. These variables can include, but are certainly not limited to, material stream compositions, viscosities, temperatures adhesive/cohesive properties, inclusions, base materials that effect the operation; final product specific variables such as, but not limited to, gluten free products and fiber rich material products, such as but not limited to rolled oats and flaked oats and the like; and further product variables such as but certainly not limited to product sizes, product shapes, and similar variables.

For instance, as a non-limiting example, the portioning process for cookie dough can vary extensively based on a wide variety of parameters specific to a particular type of cookie. The parameters can include, but certainly are not limited to, the actual content where an easy to cut and place cookie dough may for instance simply comprise fat, flour, sugar, which is soft and this dough is easy to cut and will slice off from the extruded stream and place well. Dough that causes issues or does not allow for optimal placement can typically contain inclusions such as but not limited to chocolate chips, raisins, nuts, oat flakes, and similar ingredients or be of a stiffer nature or composition, such as in the case of biscotti which will be both a stiffer dough in nature as well as having significant inclusions in a typical product.

As a further example, the temperature and viscosity of the material may also vary. Likewise the cookie dough may have a very high fat content or other material properties that make it overly viscous. There is also a wide range of food products that are extruded with varying viscosity such as when going from soft cookie dough or gluten free mixes which have lower viscosities during the manufacturing process to those mixes and products that are cooled, chilled or refrigerated in preparation before being cut and portioned before freezing, e.g. pre-forming before freezing.

Another complication comes about when cookies or similar foodstuffs are to be cut faster and the desire to increase the volume of inclusions relative to the volume of the extruded material. The problem has become acute given the recent desire for production of new specialty cookie products which include more inclusions such as but not limited to cranberries or nuts or other materials which are difficult to cut and new ingredients such as greater inclusion of oat flakes, or paleo ingredients that derive from nuts and seeds and gluten free dough.

These variables come together in the complex process of cutting and portioning the extruded semi-soft materials, like dough, in accurate, repeatable, and controllable portioned pieces. These variations make the optimization of the process of producing finished products from a particular line and particular cutting head difficult and therefore often require specialized lines for particular products with specialized and particular machines, which in turn increase the costs of operations and maintenance as well as increasing production time as operators change lines. All of these new materials set new conditions and or requirements for heretofore known products, increasing the need for more specialized cutter equipment since the prior art cutters cannot adjust to accommodate such a wide variety of products.

Further, in addition to the physical variables that complicate simply cutting the material, it is often the case that the final apportioned pieces are part of a production process and, therefore, the placement of the pieces is significant to the overall operation. Again, visiting the non-limiting example of frozen cookie dough pieces, when running product that is bulk product or break and bake product for eventual frozen cookie dough portions it is particularly expedient to the process that the dough portions are as densely placed as possible. Thus, if the portions do not place well then portions can place on top of each other rather than the preferred adjacent location and then bond during freezing or baking in the case of unfrozen cookie dough. To correct this, the frozen together portions would need to be separated adding time and effort to the automated process.

Additionally, another component of the cutting and placement process is separation. If the portions do not separate evenly along the appropriate cutting line, e.g. premature fracture or elongated fracture, then portions will be under and overweight, resulting in portioning errors as well as contributing to the previously mentioned placement issues. The underweight portions will not comply with packaging weight specification and the other portions will be overweight and when baked off cannot fit into packaging and therefore both are unsaleable.

Ideally, each of these products could be cut in an optimal fashion to produce consistent portioning and placement of the cut pieces, but would need a cutting operation that has been optimized to the product as the cutter passes through the extrusion stream for that particular product or product line if using the existing art. Problem is you then cannot vary the cutting manner in the existing devices with any sort of adjustment, resulting in each line requiring its own device and increasing costs exorbitantly on a per product basis.

In the prior art machines this optimization is often difficult if not impossible to carry out as these machines are driven with fixed cams and linkages that are driven off the main shaft of the machine without any capacity or mechanism to change or optimize the velocity profile throughout the stroke of the cut. With these prior art cutters they are typically run at a set manner and speed, which remains a fixed ratio for travel speed of the cutter in its velocity profile for its stroke regardless of any ability to change the operational speed. For example, in existing linear cutters operated by cams, cams with levers, air cylinders or linear servos, the timing in these cutting heads will act in a consistent manner proportional to the speed. Adjustment is not possible without replacing the cutter head and or the drive mechanism (cams, etc.) that drive them and then still provide for only a consistent cutting velocity through the material, which does not achieve the necessary optimization and still results in waste and errors in portioning and production.

In these prior art device cutting processes the cutter is mechanically driven off a cutter main drive shaft that is driven off the main drive for the cookie machine. The main drive would turn the cutter main drive shaft and has linkages that run the cutter through various methods. The speed of the cutter is directly proportional to the rotation of the main shaft and the couplings thereto. All operations in these devices occur at a consistent speed as the drive and the ratio at which it drives the cutter main drive shaft cannot vary.

In instances where there is an adjustment provided for in a prior art device, for example on a cutter system operated by a pneumatic cylinder which can extend and retract in a consistent manner based on the air pressure and available volume of air during operations, it may be argued that there is likewise a gross speed control, but these systems will still all require adjustment from product to product and will only control the general speed of the cutter and will not allow for varying the speed, extension, or retraction of the cutting blade or action throughout the full cut cycle, thus suffering from the same limitations as the direct mechanical drive devices.

Similar limitations occur with cam and lever activated cutter travel adjustments in existing heads where the extension and retraction are controlled through the action of a cam and connected drive components but the only change in velocity of the cutter driven by these members is if the speed of the unit is changed. That is the speed of the cutter in the operation is still directly tied to production speed, or put another way, the cutter is still driven off of the main shaft and has a constant "gear" ratio, so slowing down or speeding up the main shaft is always at a constant proportion with the corresponding limits within the cutter and head and cutter.

As an example, if these types of machines change in speed from thirty cuts per minute to fifty then the corresponding speed of the cutter will also change proportionately and constantly. This arises from the direct mechanical linkages and timing intrinsic in these designs. Only changing the nature or relation of the cams and linkages through replacement or other mechanical adjustments can result in changes to the cutter and these would be limited by the size and nature of the machine as well as adding greatly to overall complexity and costs of production and maintenance.

In these prior art cutters the cutter operation substantially operates at a constant speed or varies the overall speed of the machine with a cam driven head at a substantially constant, directly related and limited velocity through the cut cycle, without the option to change speed throughout the velocity profile of the cutting head. This does not allow for the previously discussed optimization within the system to control portioning, placement and product and almost always results in issues with non-optimized cutting and release and placement of the portioned pieces when you go from one product to a different product or when going from a large to small extrusion diameter.

Without the capability to make such adjustment particularly for material changes or variations, such as cookie dough that is more difficult to work with, for instance a cookie dough stream with inclusions as previously mentioned, where it is stiff and or has inclusions in it these factors can act to hold the cookie together until the cutter hits for instance an inclusion at or near the end of the cut and then the cookie will prematurely separate or be flung from the extrusion stream and away from the cutter resulting in the issues previously discussed with portioning, placement, and product accommodation.

With the resulting inconsistent release of the cookie portion coupled with a high energy level being imparted by the cutter into the extruded stream of semi-solid material, that being cookie dough in this non-limiting example, this results in the cookie dough portion being "flung" and not dropped in a consistent location as desired. The inconsistent dropping or release or placement can result in cookies baking together. The result of such misapportionment and misplacement is cookie portions that are inaccurately weighted or portioned alone or in conjunction with misplaced portions that can bake together or may be too large or misformed rendering the joined or misformed cookies un-saleable.

Furthermore, with prior art machines to facilitate the particular cutting profiles needed for any kind of attempt at optimization of cutting speeds to particular product it requires optimization of the physical subcomponents, e.g. linkages, air cylinders, etc. But the nature and complexity of the cams and like components driving the existing prior art heads at a single velocity profile much less the repetition of cams and linkages to provide some level of variability renders provision of variability in a single head or exchange of these components very difficult to achieve. In some instances even if these components or the entirety of the cutting heads were exchangeable in part or in their entirety, it would still result in significantly increased production costs ranging from the time taken to make exchanges to the storage area for the various components to the variety of heads or components themselves to the changeover of other elements in the line to facilitate production speeds.

There exists a need for a new flexible system to not only replace the previous cutting system but also add aspects that can overcome the inherent short falls of prior art in the process of cutting and fully realize optimization of the cutting process and provide a cutting process that is faster, more accurate, and enhances the cutting of dough mixtures that have created greater challenges to cutting accurate portions to date while providing for the ability to service more product lines with fewer changeovers and lower changeover times. Simultaneously, this optimized cutting process would provide for improved resulting placement of the products and arrangement for processing the materials.

There exists a further need to provide a highly adaptable cutting head with optimizable and customizable programmable velocity profiles to provide for more accurate portioning, more efficient operations, and more accurate cutting.

The instant invention provides such a device, providing for a programmable cutter head with, for example but certainly not limited to, a linear servo or rotary servo motor which operates the cutter and allows for the change of the speed of the cutter as it passes through the material in a defined cutting cycle, from the point of entry into the material to make the cut until exit, having a variable velocity profile across the length of cut. This allows for very accurate control of the portioning, adjustment of the speed of the cutter head so as not to impact the dynamics of the cut portion when dropping after the cut, and more accurate control of the eventual placement of the cut, portioned pieces. Such a system would also coordinate control of other elements of the extrusion machine in conjunction with the velocity profile. Feed roller speed, extraction volume, conveyor speed and the like can be synchronized to the velocity profile so that the changes achieve the desired results in the extruded output, as noted for instance in the case of biscotti production.

Such a system would also provide for enhanced control of the speed of the cutting element through the cycle over the prior art, storage of the particularized speed profiles for the cutting mechanism in machine memory, and then adjustment of the velocity of the cutting element in the cutting velocity profile for a different cutting cycle without necessitating changes in the cutting head, a heretofore unknown advantages in such cutting heads. The instant invention envisions a control system with the ability to vary the speed of the cutter at points through the passage of the cutter as it cuts through along its travel path without the need for expensive changes in linkages and the like components for each product change and storing each such profile for each product type. It would also allow for programming of such recipes and associated automatic adjustments.

SUMMARY OF THE INVENTION

An aspect of the invention is to provide a programmable, recipe driven, scalable, customizable, and optimizable cutting head in a portioning machine and method of operating same.

A further aspect of the invention is to provide a variable speed cutting head with a velocity profile that can be programmed to vary the instantaneous velocity throughout the cutting of an extrusion stream so as to improve the productivity, accuracy, and control of placement of portions in an extrusion and portioning machine.

A still further aspect of the invention is to provide a highly adaptable cutting head with optimizable and customizable programmable velocity profiles to provide for more accurate portioning, more efficient operations, and more accurate cutting.

Yet another aspect of the invention is a programmable cutter head with a linear servo or rotary servo motor which operates the cutting element and allows for the change of the speed of the cutter as it passes through the material in a defined cutting cycle, from the point of entry into the material until exit, having a velocity profile across the length of cut of the cutting element.

An aspect of the invention includes very accurate control of the portioning by adjustment of the speed of the cutter head so as not to impact the dynamics of the cut portion when separating and dropping after the cut, and more accurate control of the eventual placement of the cut, portioned pieces.

A still further aspect of the invention includes enhanced control of the speed of the cutting element through the cutting cycle, storage of the particularized speed profiles for the cutting element in machine memory, and adjustment of the velocity of the cutting element in the cutting velocity profile for a different cutting cycle without necessitating changes in the cutting head, providing heretofore unachieved versatility in a single cutting head.

Another aspect of the invention is a control system with the ability to vary the speed of the cutter at points through the passage of the cutter as it cuts through along its travel path without the need for expensive changes in linkages and like components for each product change and storing each such profile or recipe for each product type as well as programming of such recipes and associated automatic adjustments.

A still further aspect of the invention is to provide a cutter head system that provides improved placement control of cut sections by controlling the velocity of the cutting element throughout its stroke and coordinating it with further movement of the cutting head on its return in the cutting cycle.

The invention includes a method, an apparatus, and an article of manufacture.

The apparatus of the invention includes foodstuff extrusion cutter head assembly having a programmable velocity profile with at least one servo motor, an at least one sensor, an at least one controller, an at least one controller interface, an at least one controller memory, a cutter shuttle coupled to the servo motor and an at least one cutter element. The at least one controller is programmed with a velocity profile through the at least one interface with the program stored in the at least one controller memory wherein the at least one cutter shuttle is driven at a first velocity through a first portion of a cutting cycle in the velocity profile as it passes through an extruded material stream and a second velocity before completing the cutting cycle in the velocity profile through the extruded material stream.

The first velocity can be lower than the second velocity. The velocity can be lowered from said first velocity to said second velocity at a point before the extruded material stream would normally shear if the higher first velocity were maintained. The velocity change from said first velocity to said second velocity occurs as the amount of dough remaining in the extruded semi-solid stream is reduced The point at which the changes from said first velocity of the cutting element is directly related to a time of cut or a percentage of cut through the extruded material stream. The preferred percentage of cut is typically between thirty and fifty percent of the material stream.

The apparatus of the instance invention further includes a foodstuff extrusion portioning device having a programmable velocity profile throughout the cutting cycle. The apparatus includes a hopper, an extrusion die in communication with the hopper and extruding an extruded foodstuff stream a cutter head having an at least one servo motor coupled to a cutter assembly mounting a cutting element, an at least one controller having an at least one memory with an at least one PLC and an at least one interface together with an at least one conveyor. The at least one controller is programmed through the at least one interface with a program in the at least one memory wherein the at least one cutter assembly is driven at a first velocity through a first portion of the cutting cycle such that as it passes through the extruded foodstuff material stream passing through the extrusion die and a second velocity before completing the cutting cycle through the extruded material stream and tilting to assist in placement of a cut portion of the extruded foodstuff material stream.

The apparatus further includes a feed rate speed profile wherein the programmed velocity profile can be synchronized with the feed rate profile of the extruder such that the volume of extruded material remains consistent across the cutting cycle. The HMI can communicate to the PLC user selected inputs and the PLC then can communicate machine input variables based on the HMI user selected inputs to control the cutter assembly. The machine input variables can include at least one of an at least one: input variable controlling feed speed of the feed rollers, input variable for movement distance and velocity of the cutter assembly, input variable for a movement distance and velocity of the cutting element, input variable for a movement distance and velocity of the lower conveyor, input variable for the cutting element tilt, input variable for the cutting element angle of attack relative to the material stream, input variable for the extruder throughput, input variable for a prime mover speed, input variable for the cutting cycles per minute of the cutting assembly, input variable for the tilt timing, input variable for a rotational distance in the servo motor, input variable for a percentage of rotation of the servo motor, and input variable for a percentage of movement of the cutter assembly.

The HMI user variables can be product or material variables. The product or material variables can be at least one of an at least one: variable representing the material stream composition, a variable representing material stream viscosity, a variable representing temperature, a variable representing material stream adhesive property, a variable representing material stream cohesive property, a variable representing the addition of inclusions in the material stream, a variable representing whether the material in the material stream is gluten free, a variable representing whether the material in the material stream is fiber rich, a variable representing finished product sizes, a variable representing extrusion diameters, a variable representing finished product shapes.

The HMI user variables can be production method variables. The production method variable represents can represent a production method. The production method variables can be at least one of an at least one: variable representing the cutting assembly cutting speed, variable representing the conveyor speed, indexing feed reference variable for placement and indexing from pan to pan or from paper sheet to paper sheet on said conveyor, gap spacing variable representing the time between cuts governing distance between groups of output.

The HMI user input variables can be process or mode variables. The process or mode variables can include a pre-programmed baking operation that can be pre-programmed or included to work with product variables or recipes. The process or mode variables can further comprise specific placement characteristics that work to meet specific requirements for each mode of operation or mode variables related to the processing of the materials or product. These mode variables can include specific parameters for a recipe indicating production methods. The mode variables can indicate production by strip depositing of biscotti. The mode variables indicating production methods can also indicate constant production methods which are non-stop, consistent production of portioned pieces produced at uniform spacing. The mode variables can indicate production methods using a pan mode for production of portions needing to fit to the shape of a commercial baking pan widths with spacing that permits baking of the product and non-contact as between the adjacent portions and or no contact with the sides or perimeter of the baking pan. The mode variables can also indicate production methods for break and bake methodology and placement on the conveyor.

The food stuff extrusion cutter head assembly can include safety and operating parameter variables stored in the memory as part of the firmware associated with the extrusion cutter head assembly.

The safety and operator parameter variables can include pre-programmed limits or safety stops. The pre-programmed limits can be speed limits indicating an unsafe speed of operation or a triggered limit upon the detection of an overheating servo motor. The safety and operator parameter variables can be read by sensors or inputs monitoring for actuation of an emergency shutoff switch. The safety and operator variables can be an at least one of an at least one: variable representing a maximum cut per minute, variable representing a maximum run times, variable representing a maximum temperature of the operating components, variable representing an emergency shutoff condition, variable representing a signal from an emergency shutoff switch, a variable representing a sensor output related to a safety stop for other moving parts in the cutter assembly, operating output checks to sense when the machine is malfunctioning or must be halted for safety or operating purposes.

The method of the invention includes programming a foodstuff extrusion cutter head assembly with a velocity profile having at least two velocities for a cutter element as it passes through an extruded material stream, storing the profile in a controller for the foodstuff extrusion cutter head, and starting the foodstuff extrusion cutter head to run the stored velocity profile and cut with the cutting element in the cutter head the extruded material stream at a first velocity of the at least two velocities in the velocity profile and, before completing the cut through the extruded material, cutting at a second velocity of the at least two velocities in the velocity profile.

The method of the invention further includes a method of operating a foodstuff extrusion portioning machine, comprising the steps of placing a semi-solid foodstuff material in a hopper; advancing an at least one pair of feed rollers to feed said foodstuff material through an extrusion die; forming a stream of semi-solid foodstuff material ahead of a cutter head assembly; selecting a foodstuff product with an at least one variable from a list of products for programming through a user interface variables to control the portioning machine including a velocity profile for operating the cutter head assembly and cutting element; operating the feed of the semi-solid foodstuff material into the extrusion die and out as the stream of semi-solid foodstuff material stream; and engaging said portioning cutter head assembly with said semi-solid foodstuff material stream to cut the semi-solid foodstuff material through a cut length with a programmed cutting profile for a cutting element, the cutting profile having a first of an at least two velocities through a first portion of the cut length within the semi-solid foodstuff stream and a second velocity of an at least two velocities for a second portion of the cut length.

The method of the invention also includes a method of controlling a cutter head assembly in a foodstuff portioning machine, comprising the method steps of selecting a foodstuff product with an at least one variable from a list of foodstuff products for programming through a user interface on a foodstuff product portioning machine; programming the at least one variable to develop a cutting profile for the product wherein the at least one product variable provides for an at least one machine control input that includes instructions for a first velocity of an at least two velocities to drive the cutter head assembly during a cutting cycle as a cutting element passes through an extruded foodstuff product stream; and programming the at least one variable to develop the cutting profile for the product wherein the at least one product variable provides for an at least one machine control input that includes instructions for a second velocity of an at least two velocities to drive the cutter head assembly during a cutting cycle and prior to the completion of the cutting of a portion from the extruded foodstuff product stream.

The apparatus of the invention includes a foodstuff extrusion cutter head assembly having a programmable velocity profile. The head assembly having an at least one servo motor with an at least one sensor and an at least one controller. An at least one controller interface is provided with an at least one controller memory. A cutter shuttle is coupled to the servo motor and an at least one cutter element. The at least one controller is programmed with a velocity profile through the at least one interface with the program stored in the at least one controller memory with the at least one cutter shuttle being driven at a first velocity through a first portion of a cutting cycle in the velocity profile as it passes through an extruded material stream and a second velocity before completing the cutting cycle in the velocity profile through the extruded material stream.

The method of the invention further includes a method of controlling a cutter head assembly in a foodstuff portioning machine, including the steps of selecting a foodstuff product with an at least one variable from a list of foodstuff products for programming through a user interface on a foodstuff product portioning machine; programming the at least one variable to develop a cutting profile for the product wherein the at least one product variable provides for an at least one machine control input that includes instructions for a first velocity of an at least two velocities to drive the cutter head assembly during a cutting cycle as a cutting blade passes through an extruded foodstuff product stream; and programming the at least one variable to develop the cutting profile for the product wherein the at least one product variable provides for an at least one machine control input that includes instructions for a second velocity of an at least two velocities to drive the cutter head assembly during a cutting cycle and prior to the completion of the cutting of a portion from the extruded foodstuff product stream.

The method of the invention also includes a method of operating a foodstuff extrusion portioning machine, including the method steps of: placing a semi-solid foodstuff material in a hopper; advancing an at least one pair of feed rollers to feed said foodstuff material through an extrusion die; forming a stream of semi-solid foodstuff material ahead of a cutter head assembly; selecting a foodstuff product with an at least one variable from a list of products for programming through a user interface variables to control the portioning machine including a velocity profile for operating the cutter head assembly and cutting element; operating the feed of the semi-solid foodstuff material into the extrusion die and out as the stream of semi-solid foodstuff material stream; and engaging said portioning cutter head assembly with said semi-solid foodstuff material stream to cut the semi-solid foodstuff material through a cut length with a programmed cutting profile for a cutting element, the cutting profile having a first of an at least two velocities through a first portion of the cut length within the semi-solid foodstuff stream and a second velocity of an at least two velocities for a second portion of the cut length. The method can further include the method step of synchronizing the programmed cutting profile for the cutting element with a feed profile for the extrusion of the extruded semi-solid foodstuff stream.

The apparatus of the invention further includes a foodstuff extrusion portioning device having a programmable velocity profile throughout the cutting cycle having a hopper with an extrusion die in communication with the hopper and extruding an extruded foodstuff stream. A cutter head having an at least one servo motor coupled to a cutter assembly mounting a cutting element is coupled to the extrusion die and the extruded foodstuff stream. An at least one controller having an at least one memory, an at least one Programmable Logic Controller (PLC), and an at least one interface is provided. An at least one conveyor is included and passes under the extrusion die. The at least one controller is programmed through the at least one interface with a program in the at least one memory wherein the at least one cutter assembly is driven at a first velocity through a first portion of the cutting cycle as it passes through the extruded foodstuff material stream passing through the extrusion die and a second velocity before completing the cutting cycle through the extruded material stream and tilting to assist in placement of a cut portion of the extruded foodstuff material stream.

Moreover, the above aspects and advantages of the invention are illustrative, and not exhaustive of those which can be achieved by the invention. Thus, these and other aspects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 1A illustrates a perspective view of an exemplary embodiment of the instant invention.

DETAILED DESCRIPTION OF THE INVENTION

Figure 1B:
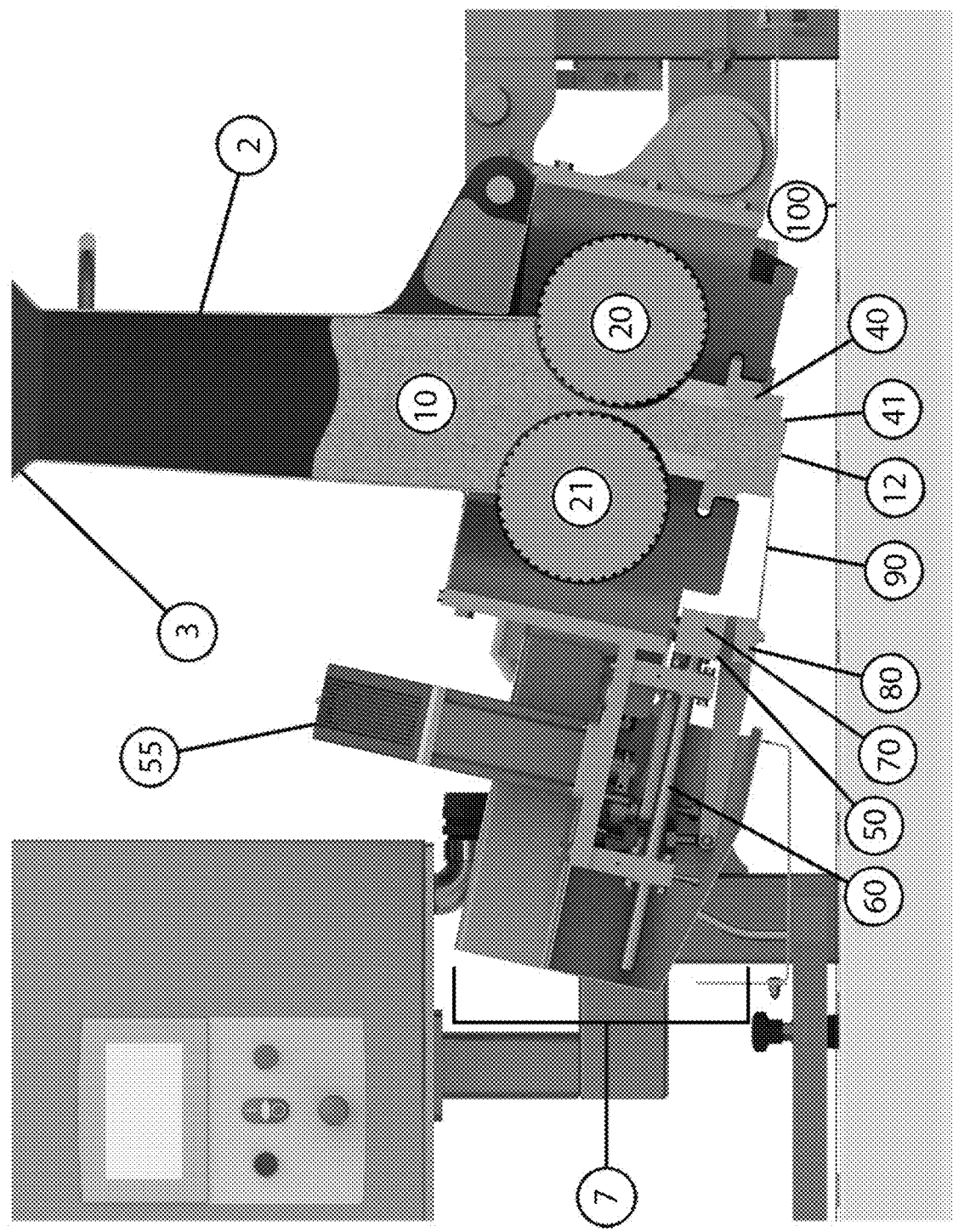
FIG. 1B shows a cross-section of the exemplary embodiment of FIG. 1A showing the cutter assembly.

The instant invention provides for a programmable, scalable, customizable, and optimizable cutting operation not available in the prior art. The invention improves the productivity of an extrusion portioning machine. It can be understood that faster or higher rates of operation are desired in such machines and the instant invention achieves higher operational speeds with greater accuracy. This would result in increased production rates over prior art machines.

To achieve this, specific improvements are contemplated in the control of the cutting element of the instant invention. When one looks at the dynamics and operation of cutting through a stream of semi-solid extruded foodstuff material it can be understood that there will be drag on the cutter surface and that is opposed or equalled by an opposing force into the semi-solid extruded material. If the cutter is passing at a very high velocity then this force being imparted into the stream of extruded material will be much higher than if the cutter is passing through the extruded stream of cookie dough at a lower speed. Thus the production speed is often limited by the speed of the cutter.

The reasons for this lies within the physics of the cutting cycle at speed. To cut and place semi-solid material such as, but certainly not limited to, cookie dough portions extruded from an extruder at a high production rate then your cutter travels at a speed sufficient to make complete cycles at this rate so as to accomplish the number of cuts per minute or production rate required. When one cuts at a high production rate the cutter must travel very fast, when the cutter travels fast through a material, such as a cookie dough, the drag on the material combined with the high velocity of the cutter produces or induces a high amount of energy into the material stream so that as the cutter proceeds to the last portion of the length of the cut and travels through the material stream the resulting portion will typically shear and separate from the stream of extruded material or dough.

If the speed is run too high, the shearing or separation will not be consistent as between the dough portions, affecting the accuracy of placement in production and finished product. If the cutter is, for example, but certainly not limited to, about eighty percent of the way through the cookie it will have a high probability of having the portioned piece shear or separate from the extruded material stream. Though this will be most consistent when the cookie dough, for instance, is of a soft homogeneous nature, even with homogeneous dough the imparted energy has a tendency to "fling" the dough at separation.

And when run faster in the case of prior art machines the cutters, as discussed above, will run at whatever the fastest possible speed of the driver at a fixed ratio as it is mechanically linked and poorly controlled. This results in the forces being imparted on the portions that are severed from the extruding stream becoming extremely high. This high stress or force acting predominantly in the shearing direction, but not exclusively limited to the shear direction, may be tolerable initially when entering the stream of extruding semi-viscous material.

But when the cutter has passed or is passing to the last amount of the stream of semi-viscous material or dough prior to separation this shear force due to the high velocity of the cutting action is high in comparison to the resistive strength in the limited remaining cross-sectional area of the non-severed stream of semi-viscous medium or dough. It can therefore be reasonably well understood that during the high-speed in the prior art cutting cycles the forces imparted into the portion of semi-viscous medium from the cutting action will approach and quickly exceed the shear strength of the remaining uncut cross-sectional area of the stream of extruded semi-viscous material and the portion will shear from the remaining stream of extruding semi-viscous material.

The forces being exerted on the portion at the time when the portion shears from the stream of semi-viscous material will influence what happens as far as trajectory or placement of the portion and the accuracy of the portion as cut. If the energy put into the portion is high the portion will travel further and not as controllably as if the energy level of the severed portion is lower, e.g. higher speed equals less consistent placement. Additional variations are introduced to portioning as well, as the high-speed operation coupled to the less controlled or less predictable shearing of the material portion in prior art devices often makes it unpredictable whether the portion weight will be consistent and accurate as well as impacting eventual placement of the portioned piece.

The instant invention through control inputs and coordinated control of the velocity of the cutter throughout the cutting cycle reduces this variability. The invention provides the ability to reduce the residual energy in the severed portion at the time when the portion severs and provides maximum control and placement of the cut portions. It more accurately controls when and where this will occur, providing greater accuracy, repeatability and predictability for the portioning. Further, the portion, as it has significantly reduced energy being put into it at the point of severance, drops or places more accurately, even straight down as compared to the prior art. Basically, it does not throw the portioned piece like existing devices, the instant invention when properly optimized drops or places it. Finally, the cutting velocity profile is coordinated with other inputs to achieve a desired result. Specifically, as noted above and throughout the specification, synchronization through timing of changes in flow rate, extruder throughput, conveyor speed, conveyor direction, and the like are utilized to achieve desired results in the final dough portion. For instance, the velocity of the feed rollers and the conveyor are synchronized to the cutter head velocity so that the biscotti dough is evenly cut across its width while still being rolled onto the pan for the length of the pan where the feed and conveyor will stop the feed at the appropriate time. The coordination of the timing of the feed speed changes is ahead of or leading the velocity changes. The feed changes taking longer to effectuate than the change in velocity profile. Similarly, a variable may need to be synchronized to follow the changes in the velocity profile.

This improves both spacing of the placed portions and avoids the need for correction for misplaced portions by later operations. It also improves the consistency and accuracy of the portioned pieces cut from the stream through the control provided in the cutting velocity profile. Thus, the instant invention allows for increased overall efficiency and speed of operation, maximizing or optimizing throughput and the accuracy of the resulting portioning and placement.

FIG. 1A illustrates a perspective view of an exemplary embodiment of the instant invention.

The semi-solid foodstuff extrusion portioning device 1 is extruding and portioning semi solid material, a non-limiting example being dough or similar semi-solid foodstuff materials, for instance dough, biscuit dough, cookies, breads, gluten free dough, oat dough and bars, scones, and similar materials. The extruding device 1 is shown with a feed hopper 2 and feed hopper entrance 3. A conveyor 100 is provided to receive portioned materials. The conveyor can also include trays, wire mesh racks, wire mesh trays, pans, paper sheeting, cardboard sheeting, or similar receiving components as is well known in the industry. The cutter head assembly 7 is shown coupled to the feed hopper 2.

The cutter head assembly 7 can also be provided as a modular element that can be quickly changed together with or exclusive of the extrusion die 40. This can be facilitated by providing quick release connectors (not shown) to connect the cutter head assembly and provide for quicker changes in instances where allergen contamination or port size/cutting stroke changes are needed.

FIG. 1B shows a cross-section of the exemplary embodiment of FIG. 1A showing the cutter assembly. Semi solid materials 10, for instance dough or similar semi-viscous foodstuff material, enters the entrance 3 into the hopper 2 and is engaged by feed rollers 20 and 21. The feed rollers 20, 21 are driven by a prime motor (not shown) and counter rotate respective to one another. This rotation governs feed rate and throughput in the extruder. This drives the dough 10 into the portion forming die 40. The feed rollers 20 and 21 entrain the dough and pull it through the gap between the rollers driving the dough through the die port or extrusion outlet 41. Roller scrapers 30 help move the adhering dough into the portion forming die 40. The dough 10 passes through to the extrusion outlet 41 and out as a stream of semi-solid extruded material 12 to be portioned and cut. It is engaged by the cutter head assembly 7.

This exemplary embodiment of the invention provides for a cutting head 7 that includes a cutting element 90, here shown as a sharp blade. The type of cutting element can be varied and can include, but is certainly not limited to a sharp blade, wire, heated wire, solid slab blade, serrated blade and similar cutting devices. Reference is made throughout to an exemplary embodiment which is shown in the FIGS. 2-8 and based on the sharp blade provided. Components of the invention may be varied to accommodate the particulars of other cutting elements or similar design changes without departing from the spirit of the invention.

The cutting element 90 of the exemplary embodiment of the cutter head assembly 7 travels on a travelling cutter shuttle 60 which is engaged with a cutter shuttle support rod 70 which supports the cutting element 90. In operation, within the controller 300 the Human Machine Interface (HMI) 305 receives input and instructs the Programmable Logic Controller (PLC) 310 which in turn controls the electric servo motor 55 which drives the support bar 60 and controls the cutting cycle of the cutter head assembly 7 and the cut of the cutting element 90. This motion of the cutting cycle and the advance of the cutting element 90 is further described in greater detail in relation to FIGS. 2-8 along with the variations in the cutting profile and the velocity profile associated with the cutting profile described in FIG. 1D, and the portioning and placement of the cut portions 15 by the exemplary embodiment of the instant invention as described.

A shuttle blade tilt pin 80 is also specifically provided to facilitate the tilt of the blade for the return component of the cutting cycle as described herein below in relation to FIGS. 6-8. The exemplary embodiment is a non-limiting example of the instant invention, variations in the components can be made as one of ordinary skill in the art would be reasonably capable of understanding. Specifically, modification of the cutting mechanism for instance to facilitate a wire cutter, a heated wire cutter, slab blade, blade insert or similar mechanism would be one such modification that is specifically embraced by the instant disclosure.

Figure 1C:
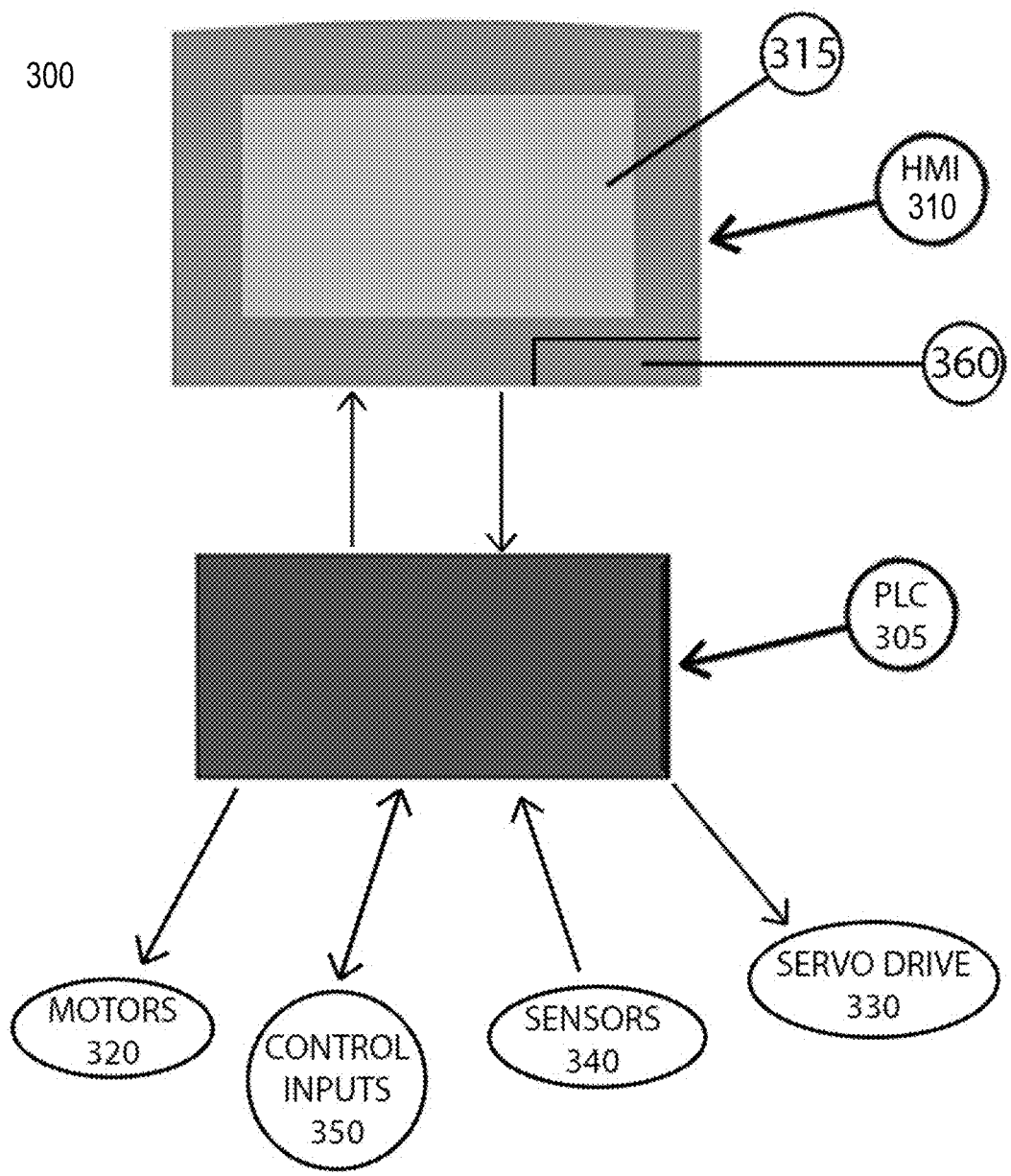
FIG. 1C shows a plan view of an exemplary embodiment of the Human Machine Interface (HMI) and Programmable Logic Controller (PLC) together with controlled elements.

FIG. 1C shows a plan view of an exemplary embodiment of the controller 300 in its housing, the Human Machine Interface (HMI) 305 and Programmable Logic Controller (PLC) 310 together with controlled elements. The plan view of the exemplary embodiment of the Human Machine Interface (HMI) 300 shows it coupled to a Programmable Logic Controller (PLC) 310 which controls devices which can include, but are certainly not limited to motors 320, drives 330, and sensors 340 and control device outputs 350 on the portion extruding device 1 in response to user inputs. The PLC 310 is a specialized controller for controlling the portion extruding device 1. Though the exemplary embodiment shown depicts the HMI 305 and PLC 310 as separate components, the invention can include an embodiment of the HMI 305 that incorporates the PLC 310 on board as a single device.

The HMI 305 shown provides a screen interface 315, in this instance a touch screen interface, which can display information related to, but certainly not limited to, starting, stopping, recipe selection, adjustment to recipes or programs, changes in any of the variables as enumerated herein, or similar inputs as part of a graphical user interface (GUI) for the machine and the cutting cycle and operation of the cutter head assembly 7.

These adjustments or controls or variables can broadly be described in principle categories which include product or material variables, process variables, production method variables, safety variables and similar categories. These categories of variables are expressed through or reduced to variations of the operational or input variables as part of a programming structure to build recipes. Thus, on a machine instruction basis, the operational or machine input variables are ultimately controlling the instant invention. These variables are stored in memory on for instance the PLC 310, the HMI 305, or the PLC 310 and the HMI 305 or an internal or external or cloud data storage device for operating the portioning device 1.

These operational or machine input variables can include inputs such as but certainly not limited to the feed speed of the feed rollers, movement distance and velocity of the cutter assembly, movement and velocity of cutting element, movement and velocity of lower conveyor, cutting element tilt, cutting element angle of attack, extruder throughput, prime mover speed, cutting cycles per minute, tilt timing, rotational servo distance, percentage of rotation of servo, percentage of movement of cutter assembly, and similar variables related to the portioning machine elements and directly controlling these elements.

Examples of product or material variables have been expressed above, and again can include but are certainly not limited to the material limitations of the extruding material forming the product. These material variables or limitations can include but are not limited to compositions, viscosities, temperatures adhesive/cohesive properties, inclusions, base materials that effect the operation; final product specific variables such as, but not limited to, gluten free products and fiber rich material products, such as but not limited to rolled oats and flake oats and the like; and variables such as but not limited to product sizes, extrusion diameters, product shapes, and similar variables. These are specifically related to process variables and adjustments. These can be stored as shortcuts in recipes and as part of a structure for programming recipes, e.g. identifying a product as frozen to initially populate a variety of the machine variables in a recipe.

Examples of production method variables can include, but are certainly not limited to, the cut speed, cut speed profile selection/creation, conveyor speed, indexing feed reference for placement and indexing from pan to pan or from paper sheet to paper sheet or when continuous paper on conveyor is used where a gap between groups of products may be desired and similar operating parameters to components of the machine. These relate directly to the product variables, e.g. spacing for specific products.

Examples of process or mode variables can include any number of baking operations that can be pre-programmed or included to work with product variables or recipes. These can have specific placement characteristics that work to meet specific requirements for each mode of operation or mode variables related to the processing of the materials or product. These mode variables can include specific parameters for the recipe for such production methods as strip depositing of biscotti or constant production methods which are non-stop, consistent production of portioned pieces that are typically produced at uniform spacing and placed on the receiving surface 100. Still another mode includes a pan mode for production of portions needing to fit to the shape of a commercial baking pan width with spacing that permits baking of the product and non-contact as between the adjacent portions and or no contact with the sides or perimeter of the baking pan.

Yet another mode variable programmable input contemplated is a variable set for break and bake methodology where the product is placed as tightly together as possible to minimize cost for packaging or packing for transport and freezer space that may be required. In this application the die ports are also set very close together and the cut/placements will also be very close together and the stored and related machine variables that are required to suit this mode variable. When product gets to the point of baking the portions are taken from the dense configuration or broken from semi or weakly bonded configuration and placed on a baking pan in a spread out configuration for baking.

A still further mode variable input can relate product placed on paper sheets in a particular, proper spacing configuration so that they can be frozen on the paper and when at the point of baking the paper sheet with spaced and placed product can be taken from the freezer and placed on a sheet pan. All product portions will remain in optimal placement so that they can be baked off and will not flow outwards to where they may flow together and adjoin to adjacent cookie portions. This mode variable including input programmed to include all necessary machine inputs to achieve this result and auto populate the recipe prior to the operation of the extruding machine 1.

A yet further method or mode variable can also be provided for the method of band oven baking, where the portioning device place spaced rows of product on the band oven baking band or trays or receiving surface. There is no need for a larger spacing to compensate for where pan to pan joints take up space so as to increase the normal cookie center to center placement.

There is also another way to produce cookies in dense or spaced configuration format and that mode uses paper on a roll that issues out onto the conveyor or product receiving surface, the cookies are then placed on the paper and a gap is made between one grouping and the next grouping. An additional part of the machine will cut the paper to length so as to make sheets of paper that will then be taken, stacked in a box and then frozen.

A still further method or mode variable can include variables for special applications such as when making bars or biscotti where the lower conveyor belt or receiving surface must travel in the opposite direction. This results in the pan sequencing differently so as to go in place, the dough feed starts and when the dough reaches the pan the pan will start to move at a speed or velocity that is synchronized to the flow velocity of the biscotti dough and roll onto the pan for the length of the pan where the feed and conveyor will stop the feed or issuance of dough will decrease, the dough stream 12 will stop, the stream will be cut so that the dough will settle into the pan, the pan will advance to the next home starting position and the sequence will repeat.

This mode is particularly advantageously operated with the instant invention, which allows for control of the velocity of the cutter as well as synchronization of the feed rollers, flow velocity and the conveyor to produce the optimum product profile. Such a mode variable can include a variety of mechanical variables to auto-populate for this operation as one example.

A further set of variables includes safety and operating parameters stored in the memory of the PLC 310 as part of the firmware associated with the portioning device. These represent specific operating parameters provided to maintain safety or monitor and control operational conditions so as not to exceed pre-programmed limits or safety stops. Generally these can be conceived of as safety variables. As firmware they can be stored on a controller 300 memory, such as the PLC 310 or HMI 305, to prevent operating, for instance, at an unsafe speeds or overheating a motor. These safety variables can include for example, but are certainly not limited to, maximum cuts per minute, maximum run times, temperature of the operating components, emergency shutoff conditions, emergency shutoff switch condition, safety stops for moving parts, operating output checks, and similar operating variables that are being read by sensors or inputs like the emergency shutoff switch to sense when the machine is malfunctioning or must be halted for safety or operating purposes. The controller will also receive outputs and inputs in machine operation variables in some circumstances such as but not limited to emergency stop and safety sensor outputs and the like as well as others that ensure use and proper incorporation or placement of guards on the machine and proper conditions for starting, operation, and ceasing of operations in the portioning device 1.

In typical operation, the HMI 305 receives the machine inputs or recipes, which are groups of related machine inputs, as entered by the operator for a particular product type with the appropriate machine inputs or using the principle categories of variables or a stored recipe. Once selected these variables are loaded or communicated to the PLC 310 which can then put the desired machine variable inputs into commands for machine readable operations.

These commands can for instance include, as noted above, control inputs such as, but certainly not limited to, feed rate of the cookie dough extrusion stream 12, feed speed of feed rollers 20, 21, movement of cutter assembly 7, movement and velocity of shuttle cutter blade 60 and cutting element 90 as well as movement of lower conveyor 100. The HMI 305 or the PLC 310 or the HMI 305 and the PLC 310 may also include communications capabilities both wired and wireless or wired or wireless so as to communicate with other computers, controllers, interfaces, or devices.

At the cutting head assembly 7, the particular variables for the cutting element 90 and its velocity profile can be carried out by instructions to a number of elements which can include for example, but are not limited to, servo motors or drives 55, servo amplifiers (not shown) and similar elements. Reference to an exemplary embodiment of a cutting cycle is further shown in FIGS. 2-8 and the exemplary embodiment of a velocity profile shown in FIG. 1D for a non-limiting example to cut a cookie portion 15 from an extruding stream of cookie dough 12 and allow or assist the cookie dough portion to be directed down and onto the receiving surface 100, here for instance a conveyor, where the cut portion 15 is placed. The HMI 305 can also show, but again is certainly not limited to showing, aspects of the program in operation and setup prior to operation and adjustments or settings which can be made so as to create or program a recipe to provide the optimal operation for a given product.

The program or recipe for operation can then be optimized and stored in the HMI 305 or PLC 310 or in the storage noted. This allows the operator to easily load and run the portion extruding device 1 each time that a particular type of product is run and also allows for adjustment of the operational program or recipe to compensate for example a difference in dough type or inclusion types or other operational elements/variables that require customization for the cutter head assembly 7 and the parameters to achieve optimum results.

Figure 1D:
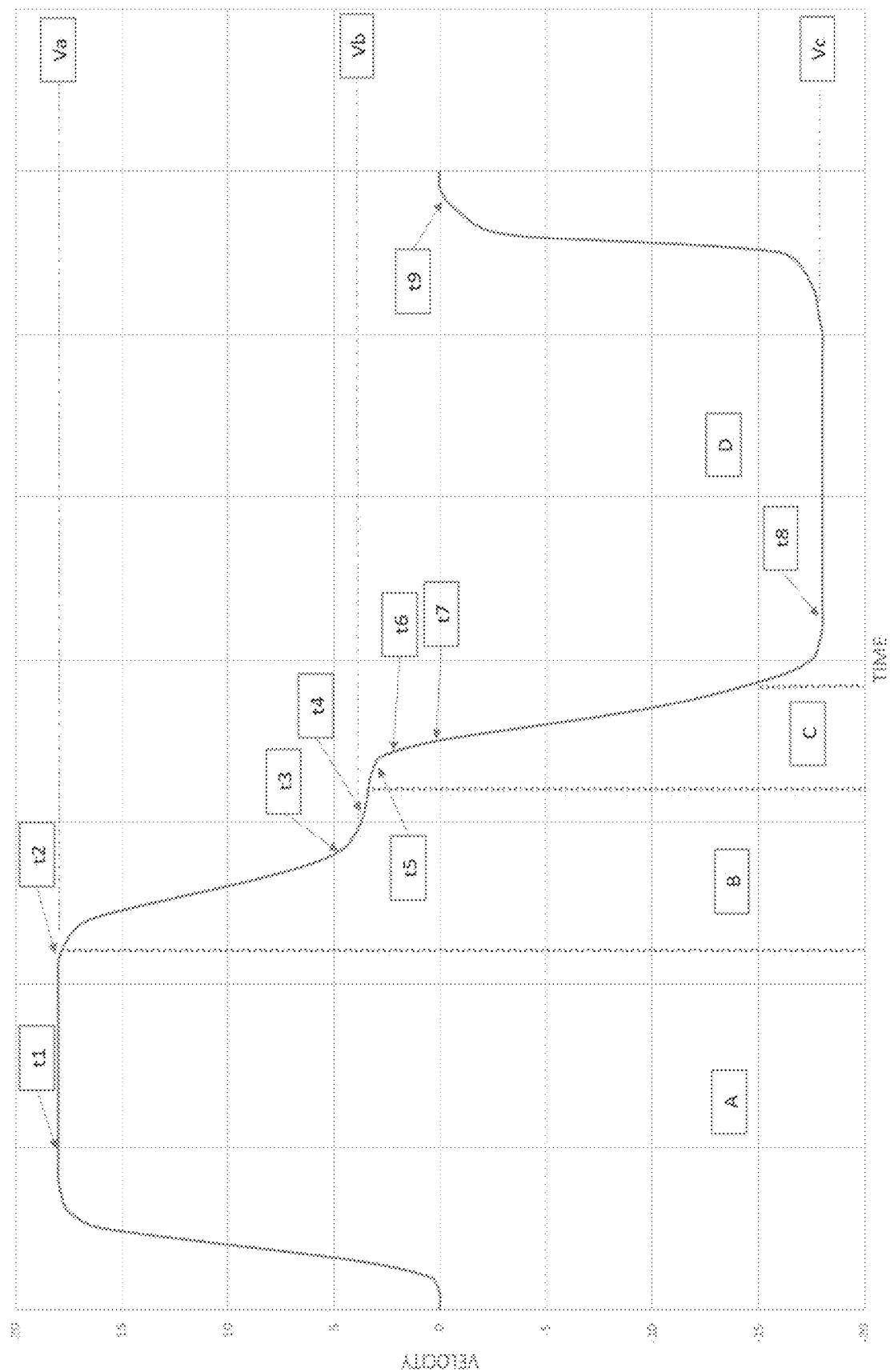
FIG. 1D shows a graphical representation of an exemplary velocity profile.

FIG. 1D shows a graphical representation of an exemplary velocity profile. In general, a particular exemplary profile is optimized for a particularized product and non-limiting reference to the velocity profile shown is for illustrative purposes. Though references are made to specific velocities (Va,Vb,Vc) and changes to these speeds, it should be understood that as seen in the graph the changes in velocity can be done in step fashion or in a continuously variable curve fashion depending on the controller type used or the operational program used or the controller type and the operational program used. In this instance, both types of controllers, stepped and continuously variable, provide the changes in velocity contemplated by the invention and can be used interchangeably to effectuate the results of the invention. Variations in the number of velocities, time, cycle length, and similar aspects can also be made without departing from the spirit of the invention and this disclosure.

In this instance the exemplary profile is for high speed cookie production which is optimized to have the cutter head assembly 7 travel along a continuously variable velocity input, resulting in the smoother curve form, from rest as fast as possible as it approaches and enters the extruded dough stream 12 so as to cut up to significantly approximately about thirty to sixty percent, most preferably about fifty percent of the way through the extruded dough stream 12 and when reaching that point, reducing velocity to move to a much lower speed so that it does not add high energy to the cookie while finishing the length of cut, as occurs in the prior art constant high speed cutting velocity machines.

As the cutter in the velocity profile reduces speed and goes more slowly through the last portion of the cookie it cuts, breaks off, or cuts and breaks off in a far more uniform and controllable manner to better place the cut portion 15. After the cut portion 15 has been cut then the speed of the cutter may again be increased in the return stroke so as to produce the fastest cutter cycle time or rate. However, when the cutter tilt is also controlled so that the cutter can remain relatively slow or match speeds with the receiving surface to aid in the drop at the moment the cut portion detaches from the extruded dough stream to the receiving surface. In synchronization the feed rollers speed and feed rate may also be adjusted to keep a consisted, clean cut as noted above, in the description of variables during operation and the example of biscotti in production. The portion will no longer be directed forward by residual energy of high speed cutting as it drops through the effect of gravity and the cutter can be used so as to assist with direction and push or nudge the cut portion downward so as to optimally place it. Once the cookie has been placed at the lower cutter velocity the cutter has no need to continue at low speed but can then increase in speed so that it can minimize the time that it takes to make a complete cycle.

The instant invention thereby completes the combination of providing an optimal portion placement and also provides a very high operational output. Comparatively, this velocity control during the cutting cycle is something unheard of in the prior art. In the prior art if driven at the same high production speed, the cut portions would be forced to fling about. The instant invention creates a new velocity profile type to get better portioning, control, and placement of the product.

Turning to the graph of FIG. 1D, the graph shows a non-limiting example of a velocity profile for a particular recipe. The graph represents one of the stored parameters, velocity of the cutting head, for the portioning device 1 of the instant invention. This optimized program or operation is stored as a recipe or part of a recipe accessible with the memory 360 of the HMI 305. The graph shows the operational inputs for the velocity over time of the cutting cycle and corresponds to the driven velocity of the cutting element 90 by the servo drive 55 during operation through the servo and linkages coupling the servo motor 55 to cutter shuttle 60. As shown, the recipe is programmed so as to have adjustable velocities at settable locations throughout the cutting cycle or path of the cutter element 90. Additionally, as noted with respect to the Biscotti example above, the velocity profile can be coordinated with the machine operation, such that the velocity profile of the cutter head is synchronized with other variables, including for instance the feed rate of the extrusion stream, the feed rollers, and the conveyor as disclosed above in reference to the example of the Biscotti. This motion of the cutter head assembly 7 and the explanation of the velocity profile being shown in greater detail in FIGS. 2-8.

As seen in the graph of FIG. 1B, at the beginning of the non-limiting example of the cut cycle, the cycle having a specific stroke and time of cut represented by the lower time axis (t) the profile will instruct the servo motor to accelerate and at t1 to drive the cutter element 90 at an initial high velocity or Va for a specified distance or percentage portion of cut travel in the cutting cycle, noted as section A, to a time t2. This correlates to and is explained in greater detail in reference to FIG. 2, which shows this initial acceleration of the cutter element 90 being driven through the semi-solid material extrusion stream 12. It should be noted that additional parameters are also being adjusted in the non-limiting example shown as further exemplified in the description of FIGS. 2-8.

Returning to the velocity profile shown in FIG. 1D, this allows the cutter element 90 in this non-limiting example to rapidly approach enter and pass through the extruded stream of cookie dough. The velocity remains at Va until about 30-60 percent of the way through the extruded stream of cookie dough at which time a lower, secondary velocity input Vb is communicated to the cutter element 90.

Figure 4:
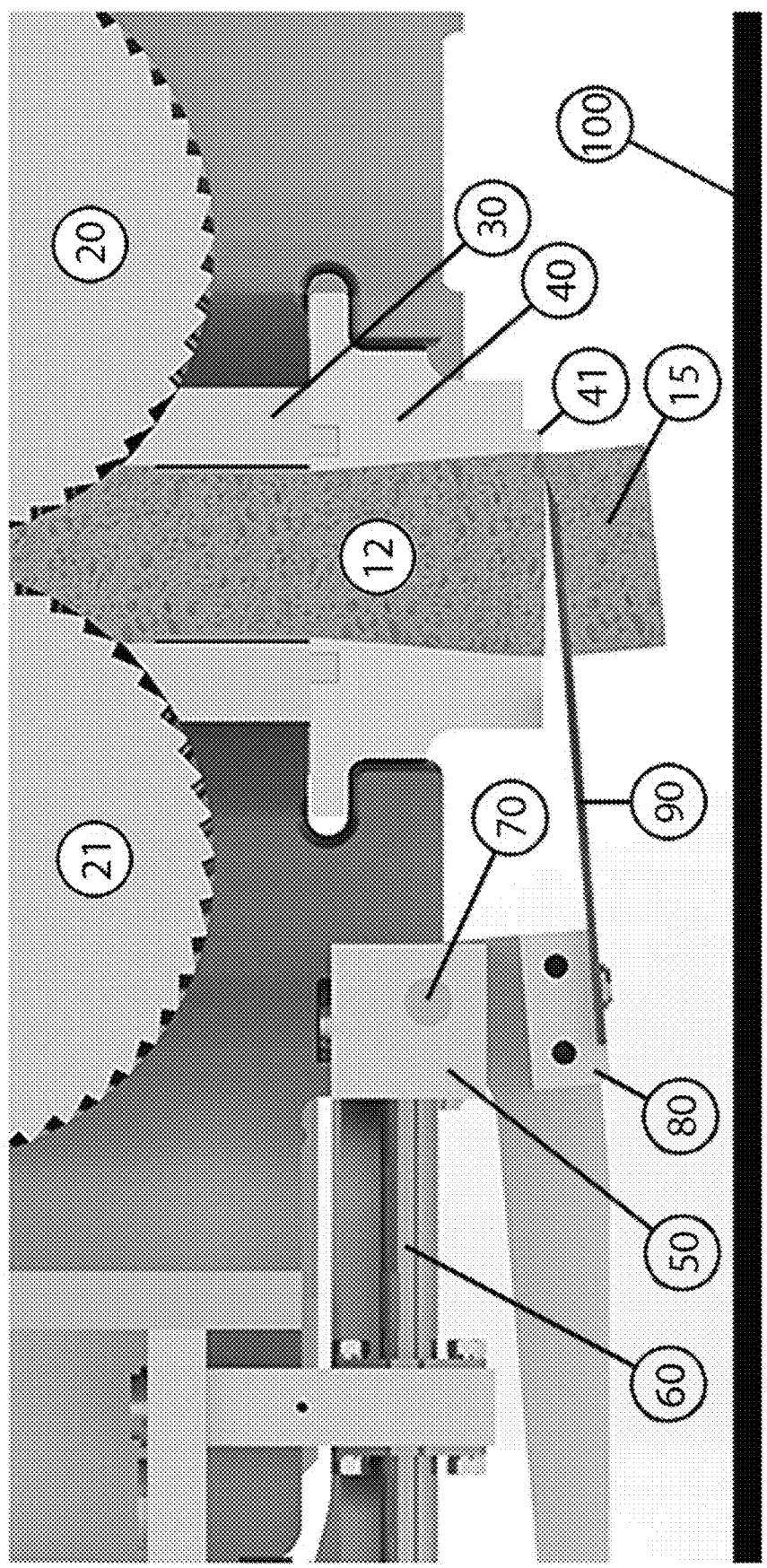
Figure 5:
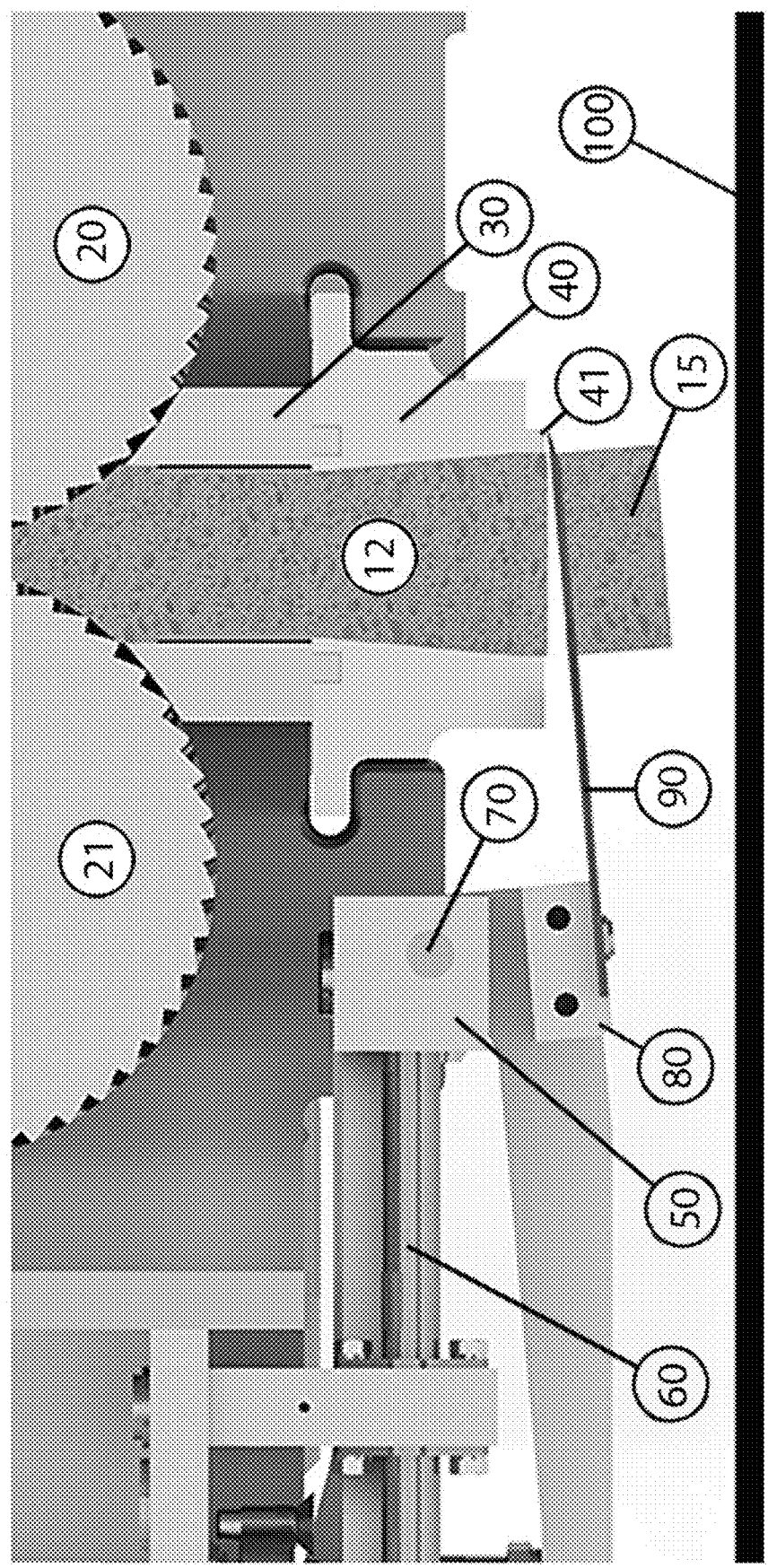
Figure 6:
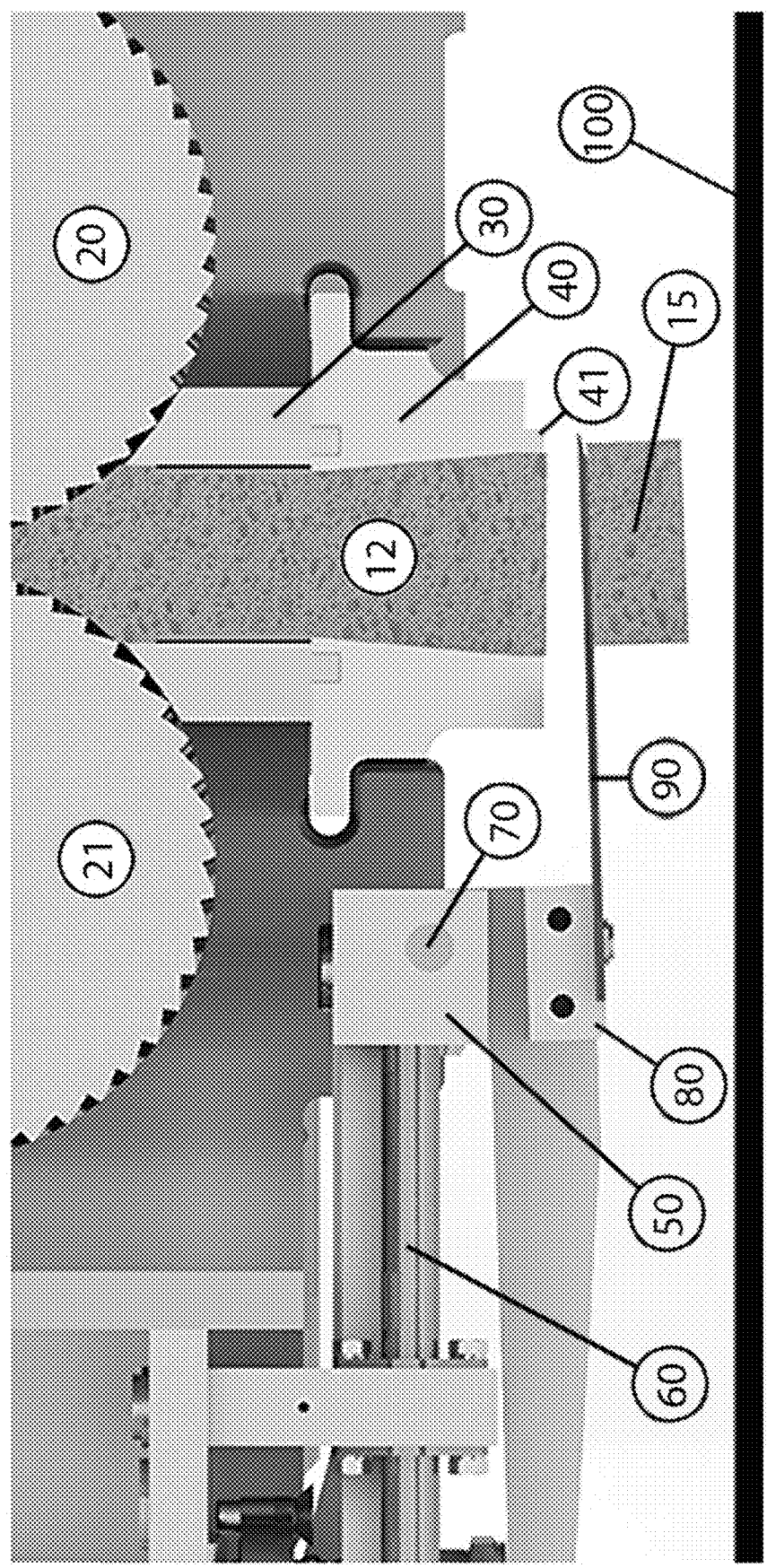
Figure 7:
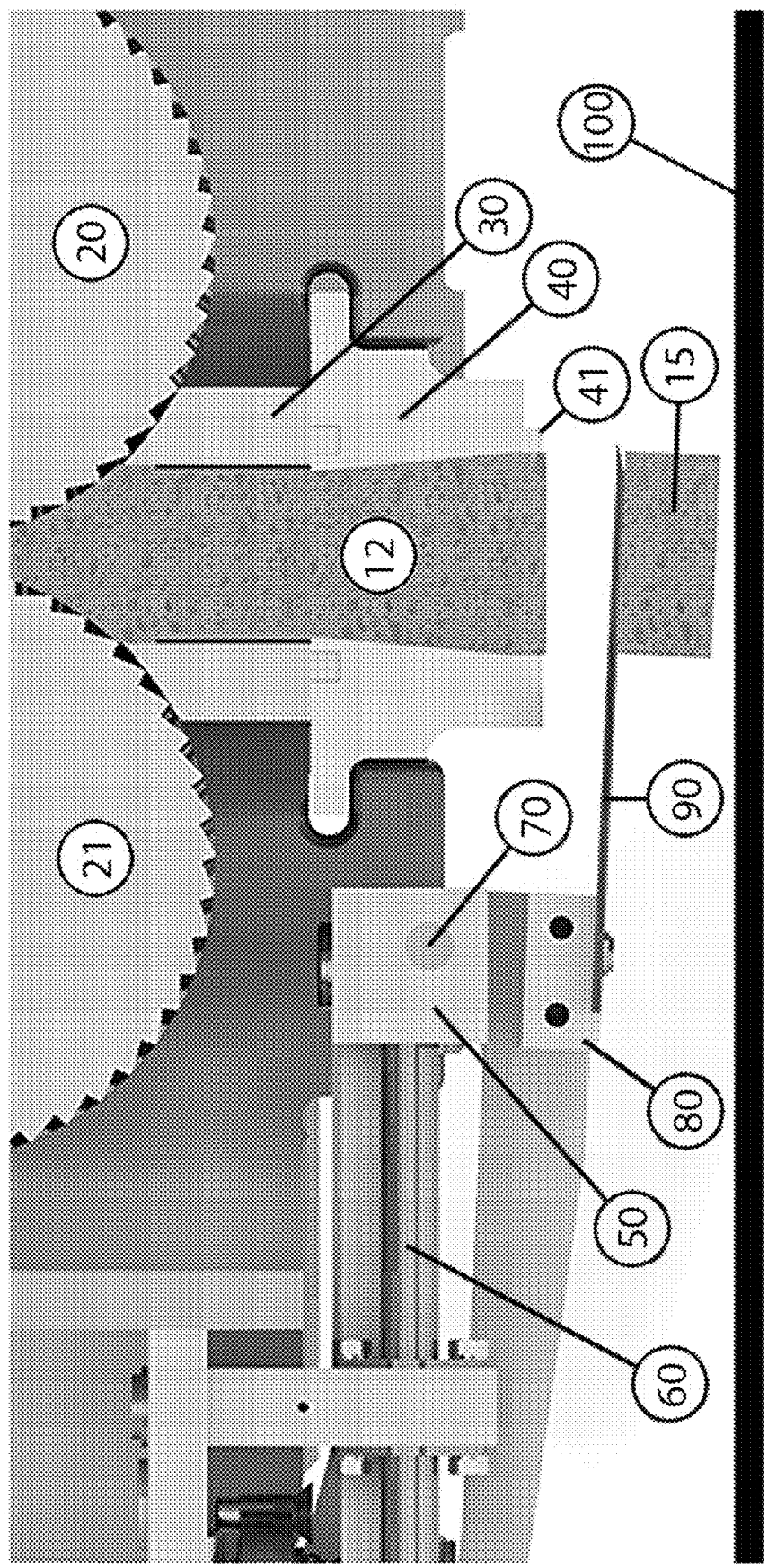

The cutting velocity Va is slowed from time t2 to t3, noted as section B under the curve, to a lower velocity Vb as the cutter 90 nears the end of the material in the material stream, as further disclosed in FIGS. 5-7 and slows to reverse its direction. In this non-limiting example this velocity Vb will slow down the cutter so as to cut at the lower velocity where it will impart a far lower degree of work or cutting energy so as to not shear or fracture portion 15 before its been significantly cut from the extruded stream of cookie dough. This correlates to FIGS. 3-7 in the non-limiting example depicted and shown as section B in the graph. This can be timed with control of the other variables as described above. For example, as with the biscotti production described above, the feed rate of the rollers can be slowed in synchronization with the cutting velocity profile slowdown near the point of separation to maintain a clean separation line for instance. This synchronization can be delayed or accelerated to accommodate the lag or lead in effecting changes to the flow rate.

The portion 15 is separated from the stream of the extruding and portioning device 1 at about time t4. At or about t5 the tilt pin 80 is engaged and the cutting element 90 is further slowed and releases the portion 15 at or about t6. The cutting element 90 continues to guide the portion briefly at t5 through t6 and the cutting element is further slowed until it stops travel in the forward direction at t7. This final cutting and placement function is shown in greater detail in FIGS. 6-8. It is graphically represented under the curve as section C.

The cutting element 90 is then moved at increasingly higher speed to a maximum speed of Vc, represented as a negative value as it is in the opposite direction to the original motion, to conclude the cutting cycle and return the cutting element 90 to the starting position as quickly as possible. The Vc velocity is achieved at time t8 on the graph and this reversing of the direction is represented as section D of the graph. It ends at time t9 returning to 0 velocity and resetting the cutting cycle.

In a non-limiting example, this velocity can drive cutting cycle times of about one second which produces sixty cuts per minute to one-half a second which produces one-hundred and twenty cuts per minute, more preferably cutting cycle times yielding about one-hundred to about one-hundred and twenty cuts per minute. The exemplary embodiment of the cutting cycle taking about 0.5 to 0.6 of a second in the non-limiting example.

Figure 2:
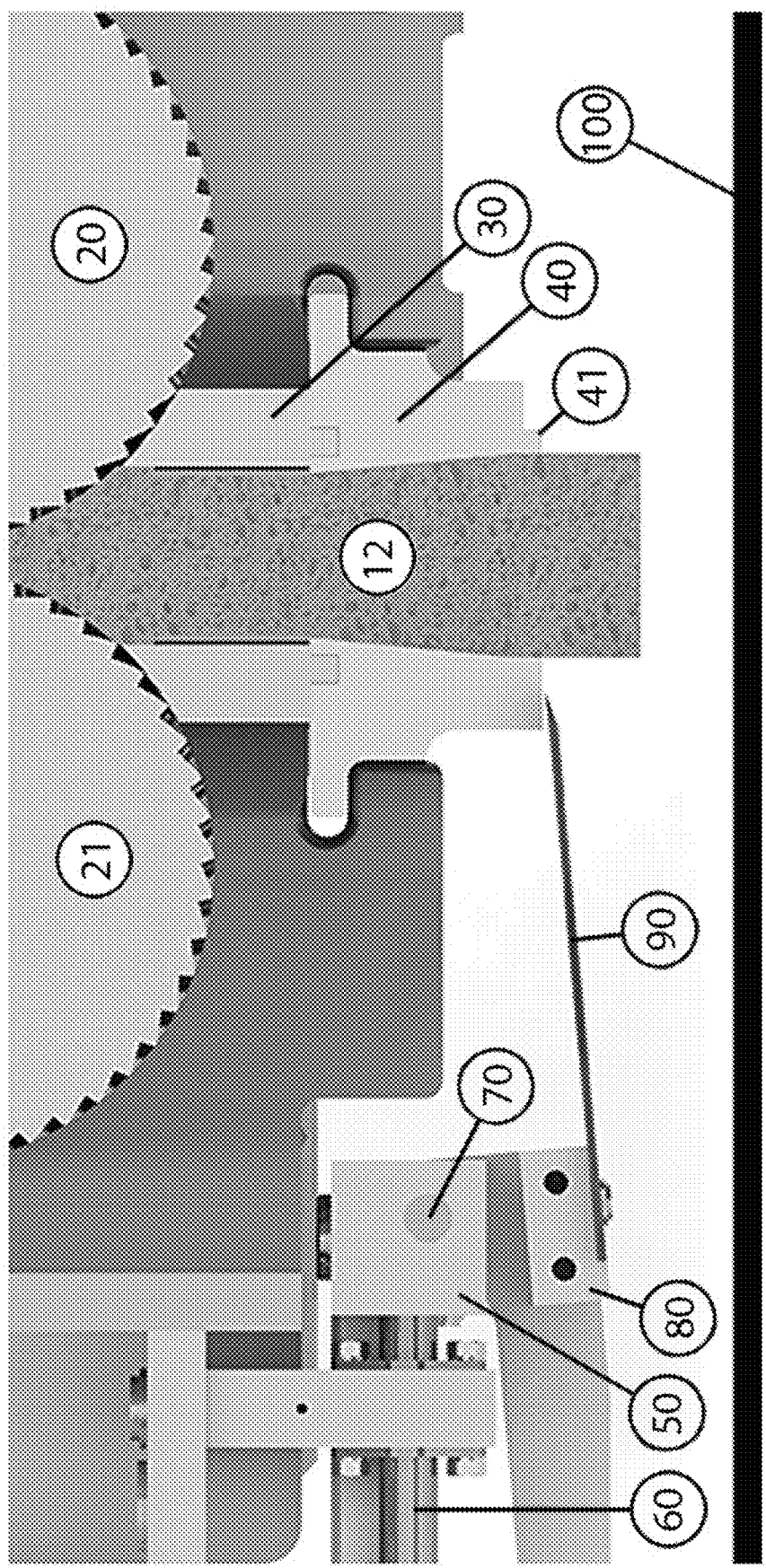
FIGS. 2-8 show close up cross-sectional views of a non-limiting exemplary embodiment of the instant invention in a cutting cycle operation.

FIG. 2 shows a side view of an exemplary embodiment of a cutter in home position and the cutter in the up position so as to start or initiate the start of the cutting operation. Dough 10, feed rollers 20, 21, die 40 and cutter element 90 are shown, where the cutter element 90 is in the fully back, retracted and upward position. The cutting element 90 is ready to come forward so as to sever the portion 15 from the extruding dough stream 10 across the cut utilizing a cutting velocity profile as discussed above in relation to FIG. 1D.

The tip of the cutter 90 is initially outside the stream of extruding semi-solid material or dough 10 and in operation the cutter 90 is rapidly approaching the stream of extruding cookie dough 10. As the stream of extruding cookie dough 10 is full diameter and has not yet been cut by the cutter 90, the cutter 90 can be moving at a very high velocity because the full diameter uncut stream of dough 10 will have the greatest degree of strength so as to resist the shear stresses being place upon or against the stream of extruded cookie dough 10 as the cutter 90 is passing through the dough 10.

It is in this approach and initial portion of the cutting cycle where the stream of dough 10 can withstand typically higher velocities in the velocity profile of the cutting cycle. The system can be operated for instance, but is certainly not limited to, running the cutter 90 at a velocity of between about 14 and 21 inches per second, more preferably at about 18 inches per second which is higher than the average velocity to achieve a production rate of 120 cuts and/or complete the number of required cycles per minute.

Figure 3:
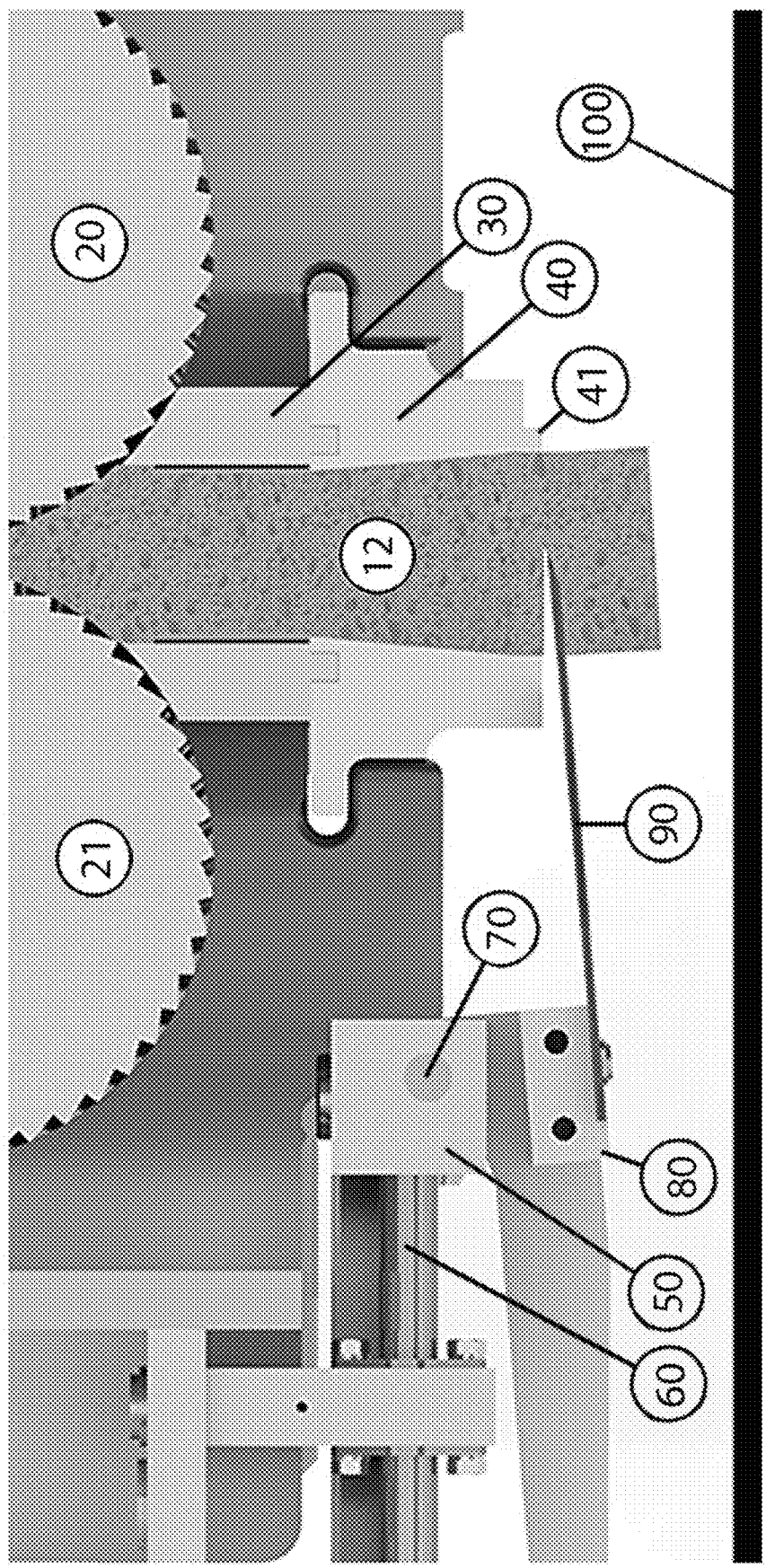

FIG. 3 shows a cross-sectional view of an exemplary embodiment of the cutter of the instant invention at or about the midpoint of the cutting cycle. As the cutter or cutting element 90 approaches about the midpoint or halfway through the cutting of the dough stream 12 and the cutting cycle, the shear strength of the remaining uncut stream of dough 12 may be approaching the limit of the forces imparted upon the dough stream 12 by the cutting action of the cutting element 90. The velocity profile of the cutting element 90 in the instant invention can for example reduce so that the energy of the cutter imparted into the portion of extruded dough 12 remains lower than the shear strength of the remaining uncut portion of the stream of dough 12.

In FIG. 3 the cutting element 90 has progressed too approximately between thirty and sixty percent, more particularly about fifty percent through the extruded dough 12 stream in the cutting cycle. This percentage of cut through which a higher velocity can be maintained is a variable of the product and this distance would be particular to the product. The shear strength of the intact dough stream governs the speeds at which the cutting element is driven and the degree to which it can pass in the dough stream 12.

For instance, if the material is more brittle it can shear at a much lower level of force then if it is a relatively more resilient mixture of say for instance, chocolate powder, whole grain, and fine flour that has been well mixed or in baker terms "developed". Where in a low development stage, like for example when pizza dough is pulled upon the dough will stretch maybe ten to twenty percent and only then snap, in a well developed dough the dough will stretch fifty to one hundred percent and at that point may still not snap.

The lowering of the velocity occurs at a point before the point where the dough would normally shear if the higher velocity were maintained. The intent is to keep the velocity under the velocity that would result in the premature shearing of the dough but as close to that velocity as possible. This velocity changes as the amount of dough in the extruded semi-solid or dough stream 12 is reduced and the chance of overcoming the shear strength is increased. That is, the maximum velocity Va of the cutting element 90 is related to the time or percentage of the cut and the amount cut through or as a percentage of the remaining material stream 12.

A lowering of the velocity to Vb is needed and programmed for a product material as a critical point in the cutting cycle of the cutting element 90 is approached in the material in accordance with that percentage or ratio. Where the lower velocity Vb in the velocity profile for the cutting element 90 can be for instance, but is certainly not limited to, between about two and six inches per second, more particularly about four inches per second. The cutting element 90 can for instance but is certainly not limited to reducing to this velocity for the period and distance difference as seen in the difference of the extruded stream 12 shown in FIG. 3 and that shown in FIG. 4.

FIG. 4 shows a cross-sectional view of an exemplary embodiment of a cutter assembly of the instant invention at or about the point of separation of the portion near the end of the cutting cycle. At FIG. 4 the cutting element 90 is shown nearing the end of its cutting cycle and the velocity profile can be varied again in this non-limiting example, as shown in Figured 1D as it approaches the end portion of the cutting cycle and the end of the extruded stream 12. In FIG. 4 the cutting element 90 in this non-limiting example would slow to be about the same velocity as that of the receiving surface 100.

During this period of movement the dough portion would begin to shear and separate from the above extruding cookie dough stream 12 due to the action of the cutting element 90 cutting through the extruded dough 12 stream. As the velocity of the cutter element 90 is slowing to the speed or velocity of the receiving surface 100 and the velocity of the cutting element 90 is very low, very little energy is imparted into the sheared off dough or cookie portion 15 and therefore the cookie portion 15 is going at or near the velocity of the lower receiving surface 100 increasing the accuracy of the location of the placement and consistency of the location of the placement as well.

In FIGS. 5-7 it can be seen that the cutting element 90 has further advanced beyond where it was in the previous figures and the leading edge of the cutting element 90 is beyond the end of the die port 40. The cutting element 90 is still above the sheared or cut off dough portion 15 in FIGS. 5-7 and at this time the cutting element 90 position is about to go through a tilt down movement so as to clear the downward and continuing extrusion of cookie dough stream 12 as shown in FIGS. 6 and 7.

As seen in FIG. 7, the cutting element 90 has completely passed through the cookie dough extrusion stream 12 but in this Figure it can be seen that the cutting element 90 is now dropping or moving away from the extrusion die 40 and pushing the cookie dough portion 15 down to the receiving surface 100 below. The dropping of the cutting element 90 is also assisting in the controlled downward motion of the cookie portion 15 to the receiving surface 100 directly below the indicated or shown cookie dough portion 15. The tilting or lowering of the cutting element 90 can also provide a secondary controlling aspect of the placement of the cookie dough portion 15 in that it is able to assist and or guide the position of the cookie dough portion 15 from the point of cut off or portion severing to the drop off and portion placement on receiving surface 100.

Figure 8:
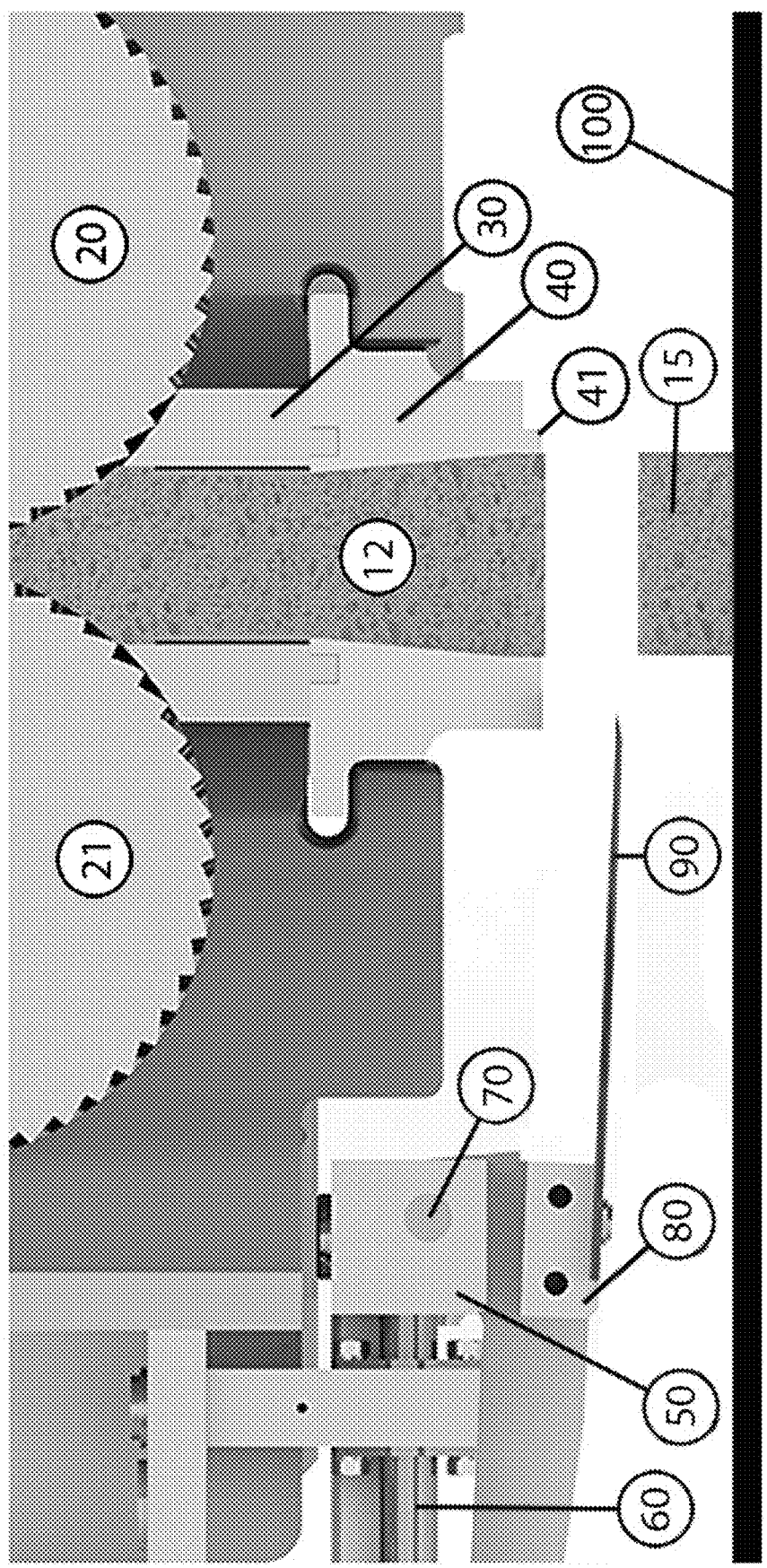

FIG. 8 shows a cross-sectional view of cutter returning to a starting position. FIG. 8 shows the tilting or lowering of the cutting element 90 from the extrusion die 40 has been reversed and the cutting element 90 as it is returned to the home or starting position in the cutting cycle. After cookie dough portion 15 has been placed onto the receiving surface 100 as shown, the cutting element 90 can have a further portion of the velocity profile in which it again resumes its higher speed so as to arrive back at the home or starting position in the cutting cycle which in this exemplary embodiment is where the cutting element 90 was positioned in FIG. 2.

In this manner the cutting element 90 operating cycle time may be at or near the target speed of 120 cuts per minute by first starting at a higher than average velocity, then as the cutting element 90 has substantially cut through the stream of semi-viscous medium or cookie dough 12 the cutting element 90 will slow to below average velocity and stay at or be below average velocity until the cookie portion 15 has been cut or sheared or separated and placed on receiving surface 100 at which time the cutting element 90 velocity would again be increased to beyond the average cutter speed and complete the cut cycle so as to be able to produce the required 120 cuts per minute. The multiple speeds within the cut cycle are embodied in the velocity profile. The velocity profile is tailored to the best operation for a given dough that allows for best cutting or severing of the portion 15 from the stream of extruding material 12 and optimal placement while maintaining a high production rate.

By comparison if a single speed operation was used where the velocity of the cutting element is always kept at constant as in the prior art, then the cutting element would impart very high energy level to the extruding cookie portion which translates to high shear forces so that the cookie portion would shear unpredictably from the cookie dough stream before the comparable cut off location of the "controlled" velocity. The results in the prior art machines is a portion that has a non consistent cut or shear and the weights of the portion can vary as to which way the shear line follows and/or how the shear line follows or goes around inclusions in the shear path. Additionally, with a high degree of energy the portion will rapidly move forward to where placement is variable depending on how the cookie shears and amount of energy loss in the shear process. Placement will be highly variable as the high energy imparted in the portion is constant throughout the cutting cycle and the energy from the higher velocity may exceed shear strength at any time. Resulting in an inconsistent separation point and thereby inaccuracies in portioning, imprecise placement, and less consistency in the delivered product, proverbially flinging the imprecisely cut portions.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A foodstuff extrusion portioning device having a programmable velocity profile throughout the cutting cycle comprising:

a hopper;

an extrusion die in communication with the hopper and extruding an extruded foodstuff stream;

a cutter head having an at least one servo motor coupled to a cutter assembly mounting a cutting element;

an at least one controller having an at least one memory, an at least one PLC, and an at least one interface; and an at least one conveyor, wherein the at least one controller is programmed through the at least one interface with a program in the at least one memory wherein the at least one cutter assembly is driven at a first velocity of an at least two velocities through a first portion of the cutting cycle as it passes through the extruded foodstuff material stream passing through the extrusion die and a second velocity of an at least two velocities before completing the cutting cycle through the extruded material stream and tilting to assist in placement of a cut portion of the extruded foodstuff material stream.

2. The food stuff extrusion cutter head assembly of claim 1, further comprising a feed rate speed profile wherein the programmed velocity profile is synchronized with the feed rate profile of the extruder such that the volume of extruded material remains consistent across the cutting cycle.

3. The food stuff extrusion cutter head assembly of claim 1, wherein the at least one interface communicates to the at least one PLC user selected inputs and the PLC then communicates machine input variables based on the user selected inputs to control the cutter assembly.

4. The food stuff extrusion cutter head assembly of claim 3, wherein the machine input variables include at least one of an at least one: input variable controlling feed speed of the feed rollers, an at least one input variable for movement distance and velocity of the cutter assembly, an at least one input variable for a movement distance and velocity of the cutting element, an at least one input variable for a movement distance and velocity of the lower conveyor, an at least one input variable for the cutting element tilt, an at least one input variable for the cutting element angle of attack relative to the material stream, an at least one input variable for the extruder throughput, input variable for a prime mover speed, an at least one input variable for the cutting cycles per minute of the cutting assembly, an at least one input variable for the tilt timing, an at least one input variable for a rotational distance in the servo motor, an at least one input variable for a percentage of rotation of the servo motor, and an at least one input variable for a percentage of movement of the cutter assembly.

5. The food stuff extrusion cutter head assembly of claim 1, wherein the user inputs are product or material variables.

6. The food stuff extrusion cutter head assembly of claim 5, wherein the product or material variables are at least one of an at least one: variable representing the material stream composition, a variable representing material stream viscosity, a variable representing temperature, a variable representing material stream adhesive property, a variable representing material stream cohesive property, a variable representing the addition of inclusions in the material stream, a variable representing whether the material in the material stream is gluten free, a variable representing whether the material in the material stream is fiber rich, a variable representing finished product sizes, a variable representing extrusion diameters, a variable representing finished product shapes.

7. The food stuff extrusion cutter head assembly of claim 1, wherein the user inputs are production method variables.

8. The food stuff extrusion cutter head assembly of claim 7, wherein the production method variables at least one of an at least one: variable representing the cutting assembly cutting speed, variable representing the conveyor speed, indexing feed reference variable for placement and indexing from pan to pan or from paper sheet to paper sheet on said conveyor, gap spacing variable representing the time between cuts governing distance between groups of output.

9. The food stuff extrusion cutter head assembly of claim 1, wherein the user input variables are process or mode variables.

10. The food stuff extrusion cutter head assembly of claim 9, wherein the process or mode variables include a pre-programmed baking operation that can be pre-programmed or included to work with product variables or recipes.

11. The food stuff extrusion cutter head assembly of claim 1, further comprising safety variables and operating parameter variables stored in the at least one memory as part of firmware within the extrusion cutter head assembly.

12. The food stuff extrusion cutter head assembly of claim 2, wherein the safety variables and operator parameter variables include pre-programmed limits or safety stops.

13. The food stuff extrusion cutter head assembly of claim 12, wherein the pre-programmed limits are speed limits indicating an unsafe speed of operation or a triggered limit upon the detection of an overheating servo motor.

14. The food stuff extrusion cutter head assembly of claim 12, wherein the safety and operator parameter variables are being read by sensors or inputs monitoring for actuation of an emergency shutoff switch.

15. The food stuff extrusion cutter head assembly of claim 11, wherein safety variables are at least one of an at least one: variable representing a maximum cut per minute, variable representing a maximum run time, variable representing a maximum temperature of operating components, variable representing an emergency shutoff condition, variable representing a signal from an emergency shutoff switch, a variable representing a sensor output related to a safety stop for moving parts in the cutter assembly, and operating output checks to sense when the machine is malfunctioning or must be halted for safety or operating purposes.

* * * * *